(12) United States Patent
Golla et al.

(10) Patent No.: US 8,504,805 B2
(45) Date of Patent: Aug. 6, 2013

(54) PROCESSOR OPERATING MODE FOR MITIGATING DEPENDENCY CONDITIONS BETWEEN INSTRUCTIONS HAVING DIFFERENT OPERAND SIZES

(75) Inventors: Robert T. Golla, Round Rock, TX (US); Paul J. Jordan, Austin, TX (US); Jama I. Barreh, Austin, TX (US); Matthew B. Smittle, Allen, TX (US); Yuan C. Chou, Los Gatos, CA (US); Jared C. Smolens, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 454 days.

(21) Appl. No.: 12/428,464

(22) Filed: Apr. 22, 2009

(65) Prior Publication Data

US 2010/0274994 A1 Oct. 28, 2010

(51) Int. Cl.
*G06F 7/483* (2006.01)
(52) U.S. Cl.
USPC .......................................................... 712/222
(58) Field of Classification Search
None
See application file for complete search history.

(56) References Cited

U.S. PATENT DOCUMENTS

| | | | |
|---|---|---|---|
| 5,710,902 A | | 1/1998 | Sheaffer et al. |
| 5,737,629 A | | 4/1998 | Zuraski, Jr. et al. |
| 5,790,827 A | * | 8/1998 | Leung ............................ 712/216 |
| 5,822,578 A | | 10/1998 | Frank et al. |
| 5,941,983 A | | 8/1999 | Gupta et al. |
| 5,974,524 A | | 10/1999 | Cheong et al. |
| 6,014,736 A | | 1/2000 | Elliott et al. |
| 6,029,243 A | * | 2/2000 | Pontius et al. ................. 712/222 |
| 6,055,625 A | | 4/2000 | Nakada et al. |
| 6,094,719 A | * | 7/2000 | Panwar ........................... 712/216 |
| 6,105,129 A | * | 8/2000 | Meier et al. ..................... 712/222 |
| 6,356,918 B1 | | 3/2002 | Chuang et al. |
| 6,463,525 B1 | * | 10/2002 | Prabhu ............................ 712/222 |
| 6,493,819 B1 | | 12/2002 | Mahurin et al. |
| 6,505,293 B1 | | 1/2003 | Jourdan et al. |
| 6,560,671 B1 | | 5/2003 | Samra et al. |

(Continued)

FOREIGN PATENT DOCUMENTS

EP 1128262 8/2001

OTHER PUBLICATIONS

Official Action in U.S Appl. No. 12/428,461 issued May 19, 2011, 12 pages.

(Continued)

*Primary Examiner* — Jacob A Petranek
(74) *Attorney, Agent, or Firm* — Meyertons, Hood, Kivlin, Kowert & Goetzel, P.C.

(57) ABSTRACT

Various techniques for mitigating dependencies between groups of instructions are disclosed. In one embodiment, such dependencies include "evil twin" conditions, in which a first floating-point instruction has as a destination a first portion of a logical floating-point register (e.g., a single-precision write), and in which a second, subsequent floating-point instruction has as a source the first portion and a second portion of the same logical floating-point register (e.g., a double-precision read). The disclosed techniques may be applicable in a multithreaded processor implementing register renaming. In one embodiment, a processor may enter an operating mode in which detection of evil twin "producers" (e.g., single-precision writes) causes the instruction sequence to be modified to break potential dependencies. Modification of the instruction sequence may continue until one or more exit criteria are reached (e.g., committing a predetermined number of single-precision writes). This operating mode may be employed on a per-thread basis.

16 Claims, 8 Drawing Sheets

U.S. PATENT DOCUMENTS

| | | |
|---|---|---|
| 6,598,149 B1 | 7/2003 | Clift |
| 6,675,288 B2 | 1/2004 | Farrell et al. |
| 7,191,316 B2 | 3/2007 | Sugumar et al. |
| 7,237,096 B1 * | 6/2007 | Prabhu et al. ................. 712/218 |
| 7,340,590 B1 | 3/2008 | Sugumar et al. |
| 7,401,206 B2 | 7/2008 | Hetherington et al. |
| 7,434,031 B1 * | 10/2008 | Spracklen et al. ............ 712/217 |
| 7,558,945 B2 | 7/2009 | Deosaran et al. |
| 7,624,253 B2 | 11/2009 | Begon et al. |
| 7,840,783 B1 | 11/2010 | Singh et al. |
| 2002/0129224 A1 | 9/2002 | Leber et al. |
| 2004/0148492 A1 | 7/2004 | Sugumar et al. |
| 2005/0216705 A1 | 9/2005 | Shibayama et al. |
| 2005/0216706 A1 | 9/2005 | Abdallah et al. |
| 2008/0189535 A1 | 8/2008 | Agarwal et al. |
| 2008/0201556 A1 | 8/2008 | Chen |
| 2008/0276076 A1 | 11/2008 | Abernathy et al. |
| 2010/0274961 A1 | 10/2010 | Golla et al. |
| 2010/0274992 A1 | 10/2010 | Chou et al. |
| 2010/0274993 A1 | 10/2010 | Golla et al. |
| 2010/0332805 A1 * | 12/2010 | Blasco Allue et al. ........ 712/216 |

OTHER PUBLICATIONS

Office Action in U.S. Appl. No. 12/428,459 issued Jun. 30, 2011, 17 pages.

Office Action in U.S. Appl. No. 12/428,459 issued Oct. 20, 2011, 17 pages.

Office Action in U.S. Appl. No. 12/428,461 issued Sep. 23, 2011, 14 pages.

Robert M. Keller, "Look-Ahead Processors," Computing Surveys, vol. 7, No. 4, Dec. 1975, pp. 177-195.

* cited by examiner

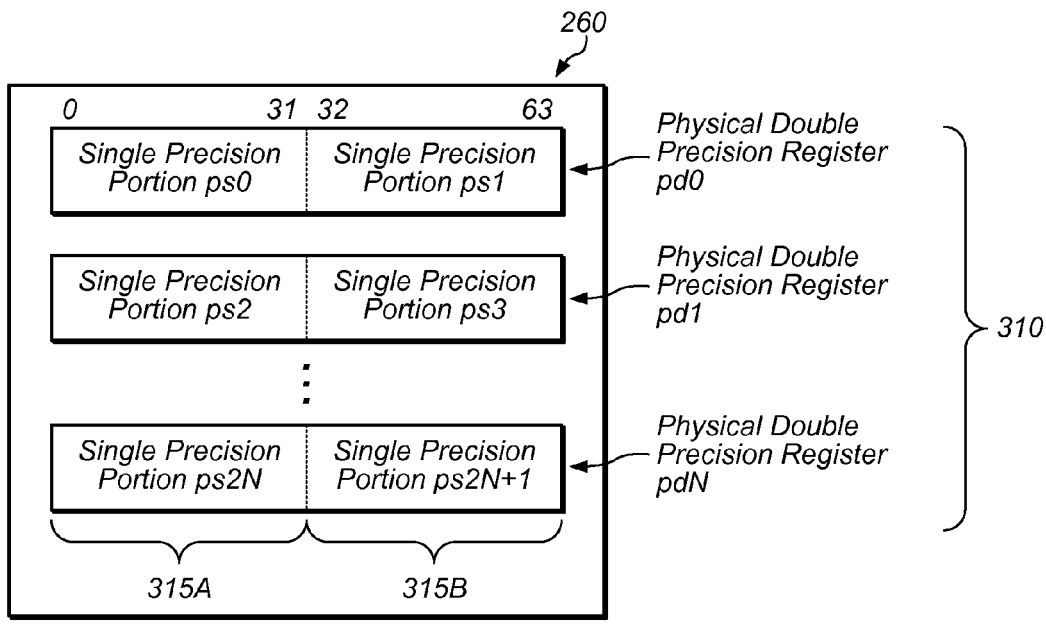
FIG. 3A
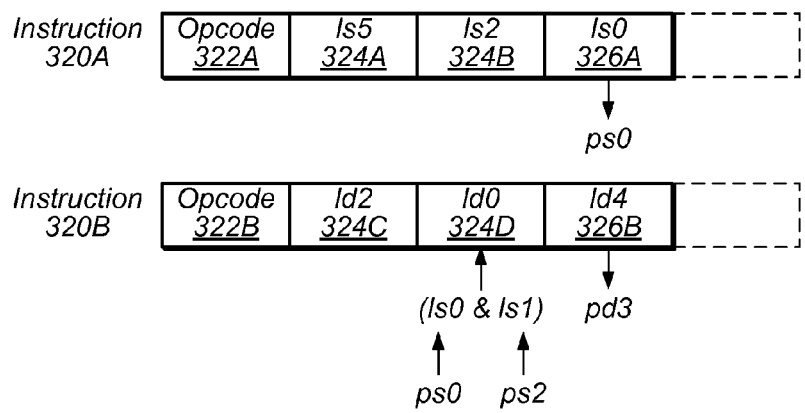
FIG. 3B
```
330                          335
fadds f0, f1, f2             ldf [o1], f0
faddd f2, f4, f6             ldf [o1+0x4], f1
                             ldf [o2], f2
                             ldf [o2+0x4], f3
                             faddd f0, f2, f4
```
FIG. 3C

410 fadds f0, f1, f2
*fmovstod f2, f3, f2*
faddd f2, f4, f6

420 ldf [o1], f0
ldf [o1+0x4], f1
*fmovstod f0, f1, f0*
ldf [o2], f2
ldf [o2+0x4], f3
*fmovstod f2, f3, f2*
faddd f0, f2, f4

PROCESSOR OPERATING MODE FOR MITIGATING DEPENDENCY CONDITIONS BETWEEN INSTRUCTIONS HAVING DIFFERENT OPERAND SIZES

BACKGROUND OF THE INVENTION

1. Field of the Invention

This invention relates to executing a sequence of instructions on a processor, and more specifically to eliminating dependency conditions such as evil twin conditions.

2. Description of the Related Art

Modern computer processors typically employ an instruction set architecture (ISA) that includes a set of floating-point instructions for performing various floating-point operations. Some instruction set architectures, such as the SPARC ISA, allow a logical floating-point register to be accessed as either a double-precision (DP) register or as two single-precision registers. Processors such as those that implement register renaming may experience a performance penalty when dependent instructions access registers using a combination of single-precision floating-point instructions and double-precision floating-point instructions in the same sequence of instructions.

SUMMARY

Various techniques for mitigating dependencies between groups of instructions (including, but not limited to, floating-point instructions) are disclosed.

In one embodiment, an apparatus is disclosed that includes a processor configured to operate in an operating mode. The processor includes a first circuit configured to perform a first type of modification of a sequence of instructions being executed by the processor when the processor is in the operating mode. The first circuit is not configured to perform the first type of modification to the sequence of instructions when the processor is not in the operating mode. The processor is further configured to enter the operating mode in response to receiving an entry indication of a dependency between a) a first floating-point instruction in the sequence of instructions having as a destination a first portion of a first of a plurality of logical registers, and b) a second, subsequent floating-point instruction in the sequence of instructions having as a source the first portion and a second portion of the first logical register. The processor is further configured to exit the operating mode in response to receiving an exit indication that at least one of a set of exit conditions has been satisfied.

In some embodiments, execution of the first floating-point instruction includes a single-precision write, and execution of the second floating-point instruction includes a double-precision read—such a dependency may be referred to as an "evil twin" condition. In one embodiment, the first circuit is configured to receive the entry and exit indications from a second circuit. In various embodiments, the set of exit conditions includes a first exit condition, where the first exit condition specifies exiting the operating mode upon a predetermined number of floating-point instructions being committed by the processor. The second circuit is configured to send the exit indication to the first circuit in response to detecting that the first exit condition is satisfied.

In various embodiments, the first type of modification includes inserting a first type of instruction into the sequence of instructions. In one embodiment, the first type of instruction is executable by the processor to move an aliased pair of single-precision floating point logical registers to respective portions of a double-precision floating point physical register, where the aliased pair includes the destination of the first floating-point instruction.

In another embodiment, a method is disclosed that includes a first circuit of a computer processor receiving a sequence of instructions to be executed, and the first circuit modifying the sequence of instructions while the computer processor is in an evil twin mitigation mode. In some embodiments, the method further includes the computer processor entering the evil twin mitigation mode in response to receiving an identification of an instruction having an evil twin condition, and the computer processor exiting the evil twin mitigation mode in response to one or more exit criteria being satisfied.

BRIEF DESCRIPTION OF THE DRAWINGS

The following detailed description makes reference to the accompanying drawings, which are now briefly described.

FIG. 3A is a block diagram illustrating one embodiment of a register file including floating-point registers.

FIG. 3B is block diagram illustrating an example of register renaming.

FIG. 3C illustrates two specific examples of instruction sequences that have evil twin conditions.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner in one or more embodiments.

As noted above, FIGS. 1-2 present an overview of an exemplary processor that is multithreaded. FIGS. 3A-D describe a type of dependency condition, one instance of which can be referred to as an "evil twin" condition. FIGS. 4-8 describe systems and methods for mitigating evil twin conditions, e.g., in a processor such as that described with reference to FIGS. 1-2. FIG. 9 illustrates an exemplary system in which a processor employing the disclosed techniques may be utilized.

Overview of Multithreaded Processor Architecture

Figure 1:
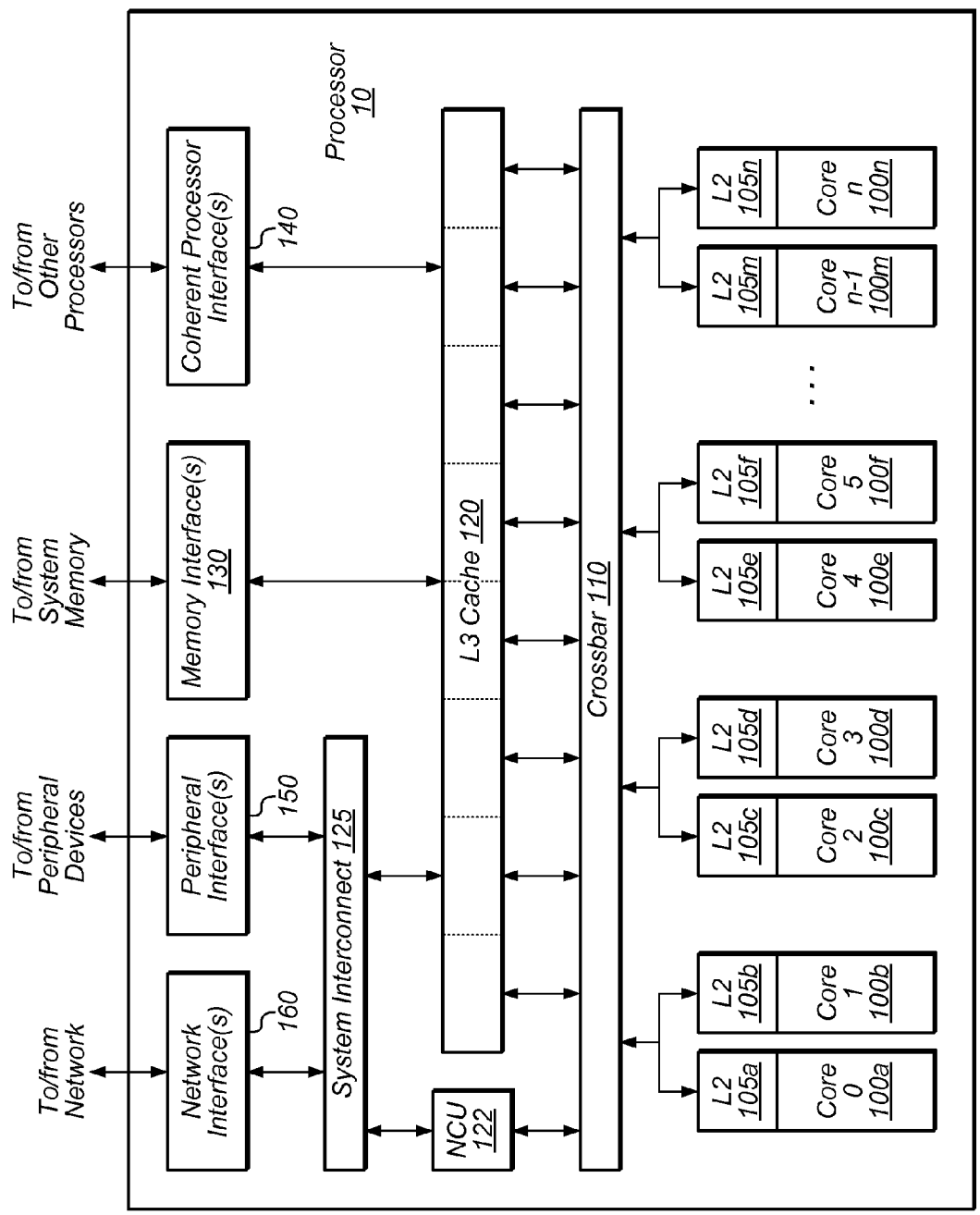
FIG. 1 is a block diagram illustrating one embodiment of a multithreaded processor core.

A block diagram illustrating one embodiment of a multi-threaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC™ V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
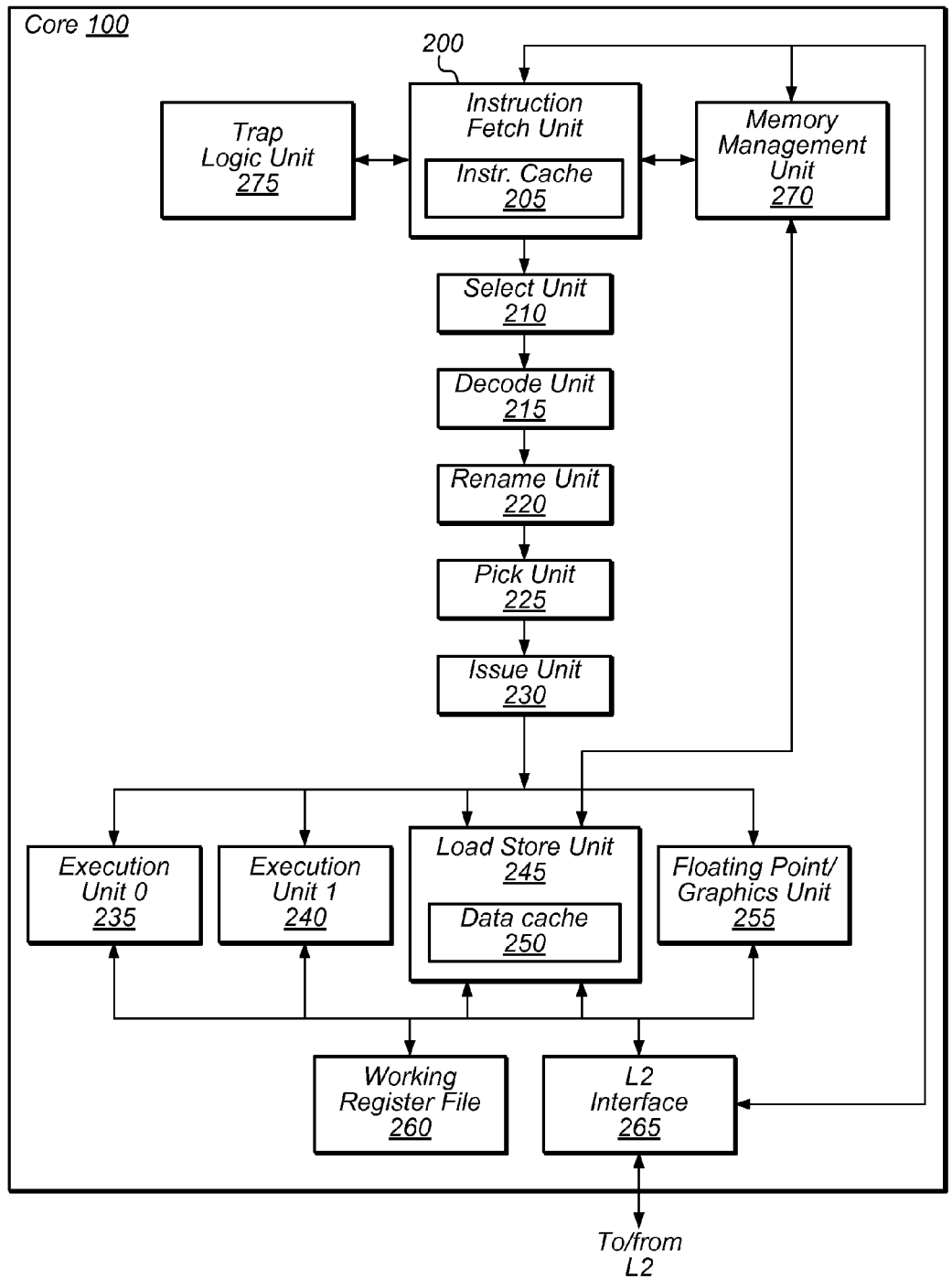
FIG. 2 is a block diagram illustrating one embodiment of a processor core that is configured to perform dynamic multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Decode unit 215 is described in greater detail in conjunction with FIGS. 5, 7, and 8 below.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VISTM) architecture, such as VISTM 2.0 or VISTM 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

TLU 275 is described in greater detail in conjunction with FIGS. 5, 6, and 8 below.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Single/Double-Precision Dependency Conditions, Including Evil Twin Conditions

As described above, register file 260 of FIG. 2 may store the results of executed instructions, including floating-point instructions. Values may be stored in registers within register file 260 according to any suitable format, including various floating-point formats. One embodiment of a register file 260 including floating-point registers is illustrated in FIG. 3A. In the illustrated embodiment, register file 260 includes a group of physical 64 bit double-precision registers 310 (referred to individually as registers pd0-pdN), each of which includes two single-precision portions 315A and 315B (shown as portions ps0-ps2N+1) corresponding to bits 0-31 and 32-63 of a register 310. The use of a 64-bit register format is merely exemplary, and other sizes are possible. Two single-precision registers that comprise a double-precision register (e.g., ps0 and ps1) may be referred to as an "aliased pair" because they can be collectively addressed (e.g., via pd0.) In some embodiments and instruction set architectures, a double-precision register may be referred to by the same name as the name for a first of the single-precision portions in an aliased pair. The context in which that name appears will make clear whether the reference is to the first single-precision portion or to the entire double-precision register (for example, whether the register name appears in the context of a single-precision instruction, or a double-precision instruction, such as "fadds" and "faddd" discussed below with reference to FIG. 3C). Register file 260 may additionally include other types of registers (e.g., fixed-point registers, not shown).

In certain embodiments, a processor (e.g., processor 10) may support read and write operations to register file 260 in which either a portion (e.g., half) or an entirety of a register is accessed (read or written). (As used herein, when the term "portion" is used in conjunction with a register, it is referring to less than the entirety of the register.) Thus, in one embodiment, register file 260 may support read and write operations that access a double-precision register 310 or only one of the single-precision register portions 315. For example, an instruction may read a value from single-precision portion ps0 and write the result into single-precision portion ps2. Alternatively, an instruction may read from double-precision register pd0 (thus reading both single-precision portions ps0 and ps1) and write the result to the double-precision portion of register pd2 (thus writing both single-precision portions ps2 and ps3).

During the course of operation, a processor (e.g., 10), in some embodiments, may execute a sequence of instructions in which a dependency condition exists between two or more floating-point instructions, where a first floating-point instruction writes to a first portion of a first register (e.g., a single-precision portion of a double-precision register), and a second, subsequent floating-point instruction reads from the first portion and a second portion of the first register (e.g., both single-precision halves of a double-precision register). In the context of a double-precision floating-point architecture, this dependency may be referred to as an "evil twin condition." The teachings of the present disclosure, however, are not limited to only single-precision/double-precision architectures (nor, strictly speaking, are the teachings limited to use with floating-point registers).

Dependencies such as evil twin conditions in a processor instruction stream can undesirably increase execution time. In particular, consider an architecture in which register renaming is utilized, where "logical" destination registers (i.e., architected registers specified by instructions in the instruction stream) are mapped to registers within a set of physical registers. The set of physical registers available to the processor for renaming may be referred to as "rename registers." Where a first floating-point instruction in the processor's instruction stream writes to a single-precision destination, only half of the physical register to which this destination is mapped may be known to contain a valid value. Thus, when this first floating-point instruction is followed by a second floating-point instruction that reads from an aliased pair that includes the single-precision register to which the first floating-point instruction's destination was mapped, undesirable latency can result as described below.

Turning now to FIG. 3B, an example of register renaming is depicted. As shown, each instruction (320A and 320B) includes an operation code (opcode) 322, logical source operands 324 that specify logical source registers, and a logical destination operand 326 that specifies a logical destination register. These logical registers are limited to the number of registers specified in the instruction set architecture (ISA) of the processor. In one embodiment, an ISA may use 16 logical registers, meaning that operand fields 324 in instructions 320 are 4 bits wide. Any suitable organization of instructions is possible. Other instructions 320 may, of course, include other combinations of operands. Other information may also be present in instructions 320.

For example, in one embodiment, once instruction 320A is decoded, the single-precision destination logical register (ls0) specified by operand 326A is mapped to a corresponding one of physical registers 310 (ps0). (In certain embodiments, all destination registers may be renamed.) In the embodiment shown, subsequent instruction 320B is executable to read from double-precision source operands ld2 (ls2 and ls3) and ld0 (ls0 and ls1). It can be seen that an evil twin condition exists here, since ls0 currently is mapped to ps0 and ls1 is not stored within ps0 (ls1 may be in a different rename register or a register dedicated to that logical register in different embodiments).

In general, hardware may be designed to read only a single source for each source instruction operand. A dependency such as the evil twin condition described above may necessitate having to read separate single-precision portions (e.g., for ls0 and ls1) from two different physical registers (e.g., ps0 and ps2) for a single instruction source operand. In other word, the evil twin condition necessitates reading more sources than required for non-evil twin conditions. Thus, to perform these multiple reads, register file 260 might have to include multiple read ports for each physical floating-point register or access each register during separate clock cycles, increasing execution time.

Turning now to FIG. 3C, two specific examples of instruction sequences that have evil twin conditions are illustrated. While these instruction sequences include instructions from the SPARC ISA, instruction sequences of other ISAs may also have evil twin conditions.

Instruction sequence 330 includes a first single-precision floating-point instruction "fadds f0, f1, f2" and a second double-precision floating-point instruction "faddd f2, f4, f6." The "fadds" instruction is executable to add the values stored in the single-precision sources f0 and f1 and stores the result in the single-precision destination f2. The "faddd" instruction is executable to add double-precision sources f2 and f4, and store the result in f6. (In the SPARC ISA, double-precision floating-point instructions use the operand of the first single-precision portion to refer to the entire double precision registers (an aliased pair)—e.g., the operand f2 refers collectively to the single-precision portions f2 and f3, and the operand f4 refers to both portions f4 and f5.) Sequence 330 thus has a dependency with an evil twin condition because "fadds" writes to the single-precision destination f2 and "faddd" reads from the double-precision source that includes f2.

Instruction sequence 335 includes four single-precision floating-point instructions "lff" that are executable to load values into single-precision sources f0, f1, f2, and f3, followed by a double-precision "faddd" instruction that is executable to add the values stored in double-precision sources f0 (i.e., portions f0 and f1) and f2 (i.e., portions f2 and f3) and store the result in double-precision destination f4. Sequence 335 has four dependencies with evil twin conditions because the load instructions write to single-precision destinations f0, f1, f2, and f3, and "faddd" reads from the double-precision sources that include f0, f1, f2, and f3.

Figure 3D:
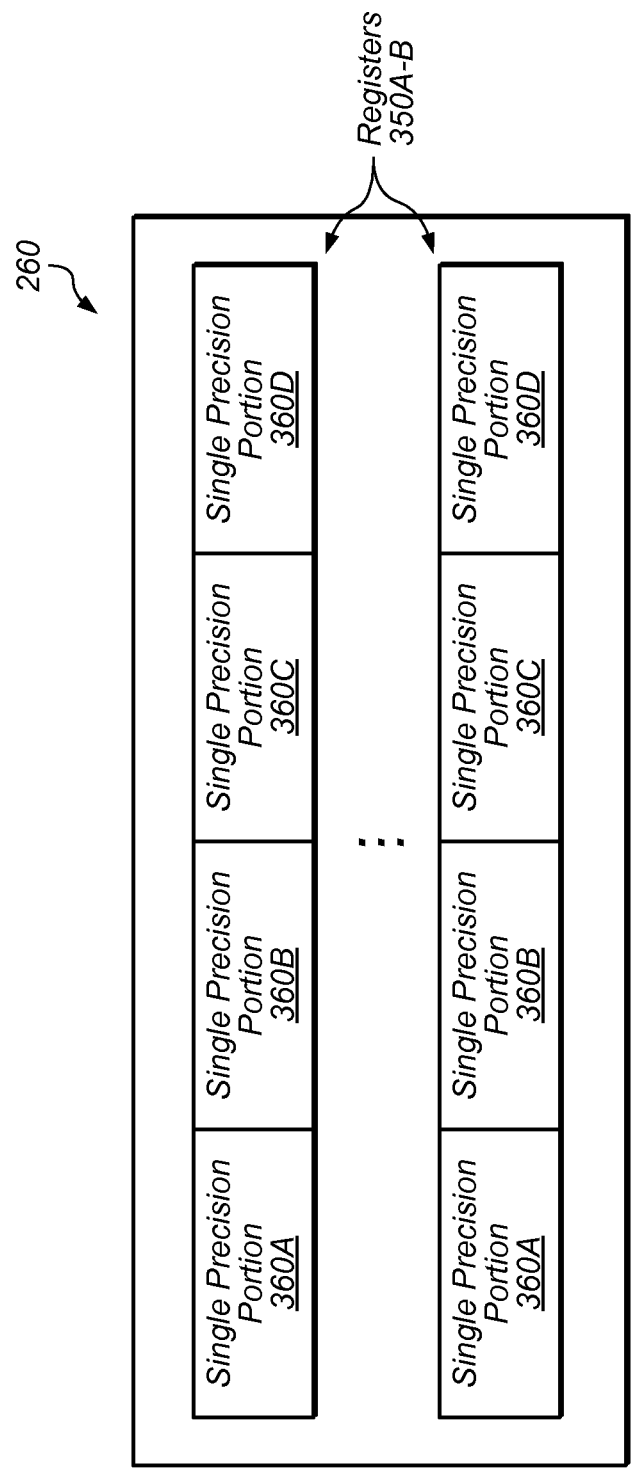
FIG. 3D is a block diagram illustrating another embodiment of a register file.

Although the above description presents examples with double-precision registers having single-precisions portions, dependencies requiring multiple reads to separate physical registers may exist in other configurations that employ different register sizes and/or different levels of precision. For example, FIG. 3D illustrates another embodiment of a register file 260 in which registers 350 each have four portions 360A-D that may be individually accessible. In other embodiments, registers 350 may be different sizes (e.g., 256 bits), and the accessible portions 360 may be larger or smaller (e.g., 64 bits or 16 bits). Accordingly, the embodiments described herein are not limited to double-precision registers having separately accessible single-precision halves; instead, the described embodiments are more broadly applicable to situations in which a portion of a storage element or register is written to, followed (not necessarily in direct succession, however) by a read from a larger portion or entirety of the element/register. Furthermore, although the disclosed embodiments are described primarily in the context of floating-point values, the teachings of the present disclosure are not so limited and may also be applied to other types of register formats.

Modifying Instruction Sequences to Mitigate Evil Twin Conditions

As will be described in greater detail below, a core 100 may, in certain embodiments, include circuitry configured to modify a sequence of instructions to be executed by core 100 in order to mitigate the effects of evil twin conditions in instruction streams.

Figures 4, 5:
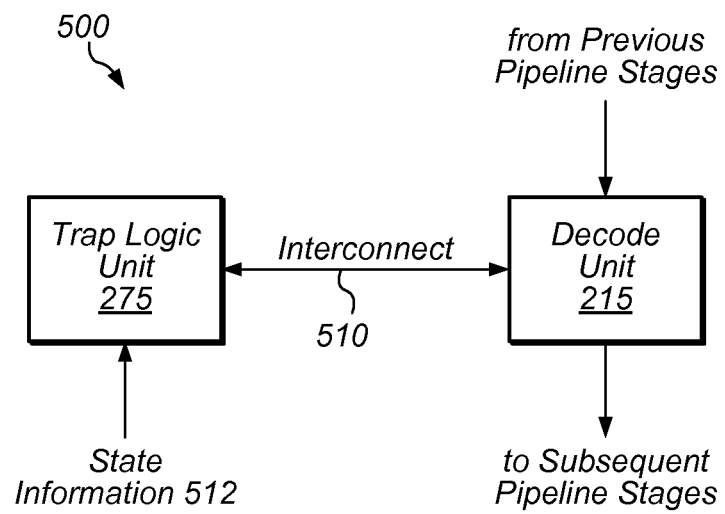
FIG. 4 illustrates two examples of modified versions of instruction sequences shown in FIG. 3C.
FIG. 5 is a block diagram illustrating one embodiment of circuitry in a processor that is configured to mitigate evil twin conditions.

Turning now to FIG. 4, examples of modified versions of the instruction sequences shown in FIG. 3C are depicted. In each of these sequences, a particular type of modification has been made—specifically, inserting a particular instruction ("fmovstod," or floating-point move, single-precision to double-precision, described further below) after each floating-point instruction that has a single-precision destination. In modified instruction sequence 410, for example, the "fmovstod" instruction is inserted after the first "fadds" instruction. Alternatively, in modified instruction sequence 420, the "fmovstod" instruction is inserted after each pair of floating-point instructions that writes to single-precision portions 315 in a given double-precision aliased register pair (e.g., ps0 and ps1 of pd0).

As noted above, "faddd" in sequence 330 is dependent on "fadds," because "fadds" stores a result in the single-precision destination f2 and "faddd" subsequently reads from the double-precision source that includes f2. The "fmovstod f2, f3, f2" instruction inserted between the "fadds" and "faddd" instruction causes both halves of the double-precision f2 aliased pair to be moved to the same physical register (the destination of the fmovstod instruction will be renamed to a double-precision physical register storing the values of single-precision registers f2 and f3). The insertion of this instruction thus "breaks" the evil twin dependency between the "fadds" and "faddd" instructions, eliminating that evil twin condition, since any subsequent use of double-precision register f2 requires a read of a single physical register.

In the sequence 335, because "faddd" is dependent on the four "ldf" instructions, because the four "ldf" instructions write values into f0, f1, f2, f3 and "faddd" subsequently reads the double-precision sources that include f0, f1, f2, and f3. The instruction "fmovstod f0, f1, f0" is inserted after the first pair of "ldf" instructions in order to move the contents of f0 and f1 into a common physical register. Similarly, the instruction "fmovstod f2, f3 f2" is inserted after the second pair of "ldf" instructions in order to move the contents of f2 and f3 into a common physical register. As a result, each double-precision read operations in "faddd" accesses only a single physical register, eliminating the need to read two different physical registers for each double-precision source.

Though the instruction "fmovstod" is shown in the examples described above, core 100 may use one or more other suitable instructions to break dependencies such as evil twin conditions.

Turning now to FIG. 5, one embodiment of circuitry 500 within core 100 that is configured to mitigate or eliminate evil twin conditions is depicted. (The techniques described herein may eliminate many evil twin conditions, but because all such conditions are not guaranteed to be eliminated in all embodiments, circuitry 500 may be said to mitigate evil twin conditions.) As shown, circuitry 500 includes trap logic unit 275 and decode unit 215 coupled together via interconnect 510. In one embodiment, trap logic unit is configured to receive state information 512. Decode unit 215 is also coupled to other pipeline stages (e.g., select unit 210 and rename unit 220 as shown in FIG. 2). In others embodiments, circuitry 500 may include additional elements (e.g., rename unit 220, etc.).

Trap logic unit 275, in one embodiment, is configured to receive state information 512, including, in one embodiment, an indication of an identified evil twin condition in a sequence of instructions. In response to such an indication, trap logic unit 275 is configured to instruct decode unit 215 over interconnect 510 to enter an evil twin mitigation mode (which, as used herein, refers to an operating mode of the processor in which the instruction stream (sequence) of the processor is modified to mitigate the effects of potential or actual evil twin dependencies). While in such a mode, decode unit 215 may be configured, in one embodiment, to eliminate detected evil twin conditions until trap logic unit 275 instructs decode unit 215 that one or more exit criteria have been satisfied, and that core 100 is no longer in evil twin mitigation mode. Trap unit 275 is described in greater detail in conjunction with FIG. 6 below.

Decode unit 215, in one embodiment, is configured to identify instructions that may create dependencies (e.g., evil twin conditions) and to modify instruction sequences in order to break these evil twin dependencies. In one embodiment, decode unit 215 breaks these dependencies by inserting an instruction (e.g., an "fmovstod" instruction or other similar instruction) after each floating-point instruction that has a single-precision destination (e.g., as illustrated in modified instruction sequence 410). In another embodiment, decode unit 215 inserts an additional instruction after each pair of floating-instructions that writes to different portions in the same logical register (e.g., as illustrated in modified instruction sequence 420). In other embodiments, decode unit 215 may insert instructions in other ways to eliminate such dependencies. Decode unit 215 is described in greater detail in conjunction with FIG. 7 below.

Figure 6:
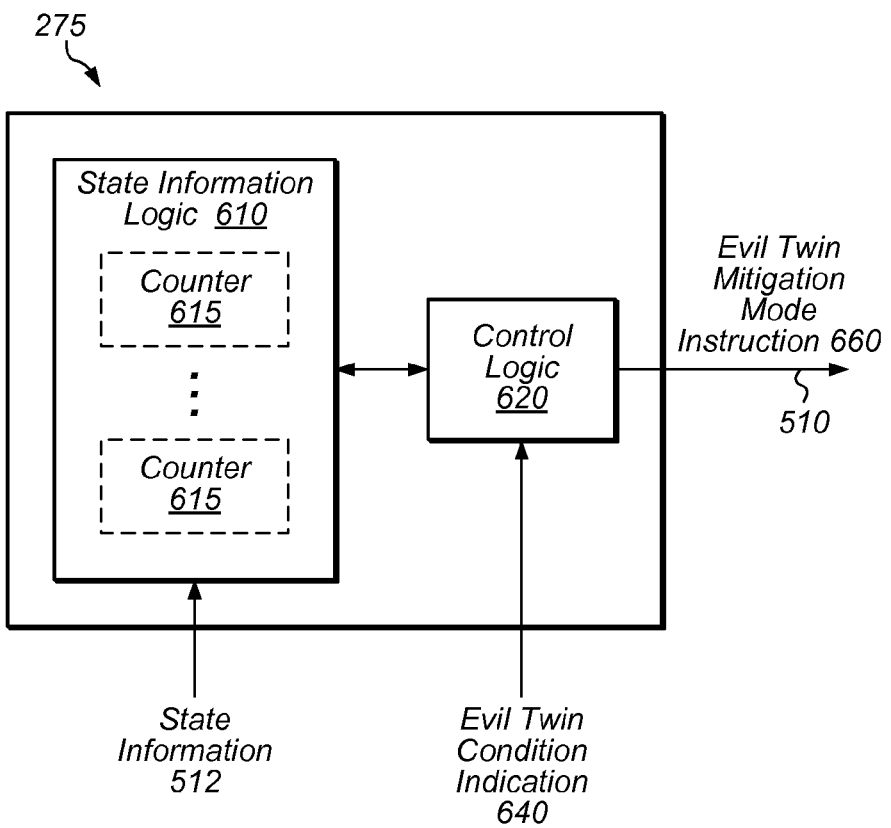
FIG. 6 is a block diagram illustrating one embodiment of a trap logic unit.

Turning now to FIG. 6, one embodiment of trap logic unit 275 is illustrated. As shown, trap logic unit 275 includes state information logic 610 and control logic 620. Trap logic unit 275 may, of course, include other blocks (not shown) for performing various other functions such as those described above in conjunction with FIG. 2. Logic blocks 610 and 620 may be combined into a single circuit in one embodiment.

State information logic 610, in one embodiment, is configured to maintain state information 630 of a processor such as processor 10. In an embodiment in which the processor is multithreaded, logic 610 may be configured to maintain state information on a per-thread basis. Logic 610 is coupled to receive state information 512 from various portions of the processor. For example, state information 512 may include various kinds of information, including the number of committed/retired instructions, the number of renamed instructions, the number of committed instructions having a single-precision destination, the number of renamed instructions having a single-precision destination, the number of clocks cycles that have transpired since entering evil twin mode, etc. Again, in certain embodiments, this information may be maintained for each thread of the processor. State information 630 may be received from any of variety of sources, including, for example, rename unit 220, execution units 235 and 240, working register file 260, etc.

In certain embodiments, state information logic 610 may include one or more counters (e.g., one per supported thread). Each counter may, for example, store a value for its corresponding thread—e.g., the number of floating-point instructions having single-precision destinations. In certain embodiments, the counter for each thread may be configured to store different types of state information for each thread—thus, one counter 615 may store the number of committed instructions for a particular executing thread, while another counter 615 may store the number of renamed instructions for another executing thread. As described below, logic 610 and counters 615 may be used, in some embodiments, to determine entry and exit into an evil twin mitigation mode.

In one embodiment, state information logic 610 is configured to monitor state information during evil twin mitigation mode. This information may be used, for example, by control logic 620 to determine whether one or more exit criteria are satisfied for exiting evil twin mitigation mode (e.g., for a particular thread). For example, if trap logic unit 275 is configured to remain in evil twin mitigation mode for a particular thread until a predetermined number of single-precision destination instructions are committed, once the corresponding counter 615 in logic 610 indicates that this predetermined number has been reached (having been incremented/decremented based on received state information 512), control logic 620 may indicate to decode unit 215, e.g., via interconnect 510, that evil twin mitigation mode is to be exited for the particular thread.

In one embodiment, state information logic 610 includes one or more registers (not shown) that store threshold values associated with exit criteria. For example, logic 610 may be configured to compare the number of committed single-precision destination instructions (e.g., stored in a counter 615) with a threshold value stored in such a register. In some embodiments, these threshold values are dynamically configurable by processor 10. For example, if an application includes several floating-point instructions, the threshold value may be significantly higher than for an application with only a few floating-point instructions. In one embodiment, processor 10 supports instructions that adjust these threshold values.

Control logic 620, in one embodiment, may also be configured to control entry into evil twin mitigation mode. In one embodiment, logic 620 may be configured to receive an indication that an evil twin condition 640 has been identified at a first point in a sequence of instructions associated with an executing thread. It may be advantageous to enter an evil twin mitigation mode upon detecting an evil twin condition since evil twin conditions may occur in groups. Control logic 620 may receive an evil twin condition indication from any suitable components within core 100, such as the various pipeline stages described in FIG. 2. In one embodiment, trap logic unit 275 receives an indication of an evil twin condition 640 from a mapping unit within rename unit 230 that is configured to maintain current mappings between logical registers that have been renamed and their corresponding physical rename registers.

Various embodiments for identifying dependencies including evil twin conditions are described further in U.S. patent application Ser. No. 12/428,457 entitled "Physically-Indexed Logical Map Table," U.S. patent application Ser. No. 12/428,461, entitled "Logical Map Table for Detecting Dependency Conditions," and U.S. patent application Ser. No. 12/428,459, entitled "Apparatus and Method For Handling Dependency Conditions," all of which are filed concurrently with the present application and are incorporated by reference herein in their entireties.

Once an evil twin condition is identified, control logic 620 may be configured in one embodiment to instruct the processor to enter an evil twin mitigation mode for the executing thread by providing an evil twin mitigation instruction 660 to decode unit 215 via interconnect 510. In some embodiments, control logic unit 620 may cause processor 10 to operate in evil twin mitigation mode for some but not all of the executing threads. Thus, processor need only enter evil twin mitigation mode for those currently executing threads for which the relevant evil twin entry criteria are satisfied.

Upon determining that a particular thread is to enter evil twin mitigation mode, control logic 620 may, in one embodiment, perform a trap flush of the thread once the instruction with the evil twin dependency is the oldest in the pipeline. In various embodiments, trap logic unit 275 may or may not save execution state prior to flushing the pipeline. Although there is a performance penalty for taking a trap flush, such penalty is overcome in many relevant instances by the offsetting performance gains that exist while operating in evil twin mitigation mode. In other words, by remaining in mitigation mode over a sufficiently large number of evil twin conditions, the cost of the initial trap flush may be effectively offset. Upon taking the trap flush, control logic 620 may also reset the counter for the relevant thread in one embodiment.

Control logic 620 may remain in evil twin mitigation mode for a given thread until one or more exit criteria are satisfied. For example, control logic 620 may instruct decode unit 215 to exit evil twin mitigation mode once a predetermined number of single-precision destination instructions are committed, a predetermined number of instructions are committed, a predetermined number of instructions are renamed, a predetermined number of clock cycles have transpired, etc. Any suitable exit criteria are possible in various embodiments. As stated above, in some embodiments, the exit criteria for one executing thread may also be different from the exit criteria of another executing thread. In various embodiments (noted above), state logic 610 may indicate to control logic 620 when various exit criteria are satisfied. Alternatively, control logic 620 may monitor state logic 610 to determine when exit criteria are satisfied.

Figure 7:
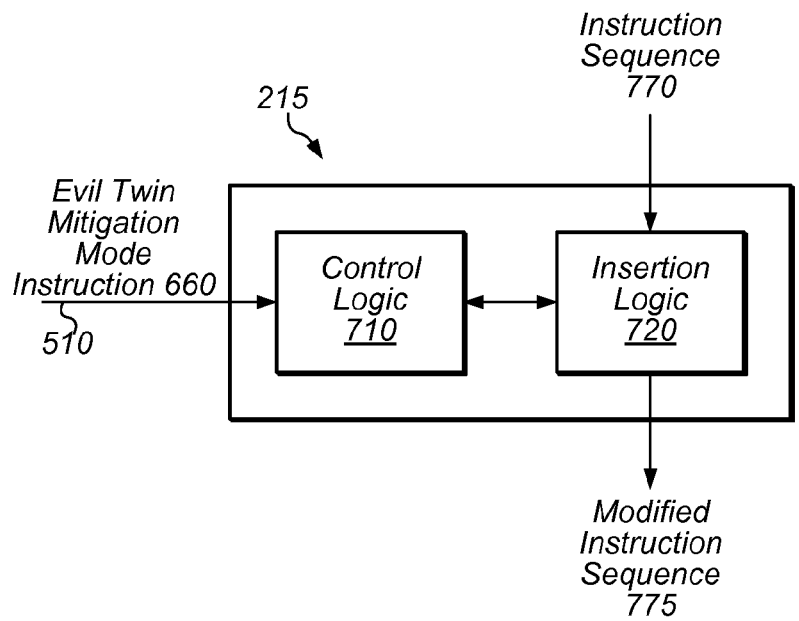
FIG. 7 is a block diagram illustrating one embodiment of a decode unit.

Turning now to FIG. 7, one embodiment of decode unit 215 is shown. In the illustrated embodiment, decode unit 215 includes control logic 710 and insertion logic 720. Decode unit 215 may, of course, include other blocks (not shown) for performing various other functions such as those described above in conjunction with FIG. 2.

Once an indication to enter evil twin mitigation mode (e.g., instruction 660) is received, decode unit 215, in one embodiment, identifies instructions in instruction sequence 770 that may be evil twin "producers"—specifically, instructions that include floating-point single-precision writes when executed. While such instructions may or may not be followed by an instruction that actually creates an evil twin dependency (an evil twin "consumer," a floating-point double-precision read that includes the logical register corresponding to the destination of the evil twin producer), the instruction sequence following these instructions may be advantageously modified to increase performance of the processor. In one embodiment, upon detecting an evil twin producer in evil twin mitigation mode, insertion logic 720 modifies instruction sequence 770 in order to break a potential evil twin dependency. Thus, by control logic 710 indicating that the processor is in evil twin mitigation mode for the executing thread (control logic 710 may be a single bit or a register in one embodiment), insertion logic 720 may, in one embodiment, insert an instruction after every identified floating-point instruction that has a single-precision destination, and continue in this manner until evil twin mitigation mode is exited for that thread. In another embodiment, decode unit 215 may be configured to modify instruction sequence 770 only for those pairs of instructions that create actual evil twin dependencies. In certain embodiments, control logic 710 may identify evil twin producers to insertion logic 720.

Insertion logic 720, in one embodiment, is configured to insert instructions into instruction sequence 770 producing modified instruction sequence 775. In various embodiments, insertion logic 720 may, in evil twin mitigation mode, treat floating-point instructions with single-precision destinations as "complex2" operations, meaning that these instructions are split into two "micro-ops" (instructions). In one embodiment, insertion logic 720, in response to detecting a potential evil twin producer, inserts the original floating-point instruction that has the single-precision destination as the first micro-op and inserts a floating-point move/copy (FSRC2) operation (analogous to the "fmovstod" instruction described above) as the second micro-op. The FSRC2 operation, in one embodiment, has two floating-point single-precision sources and one floating-point double-precision destination. The operands of the inserted FSRC2 micro-op may be constructed such that one single-precision source is the floating-point single-precision destination of the potential evil twin producer, the other single-precision source is the other half of the aliased register pair, and the destination is the double-precision register pair. For example, if the single-precision destination is ls0, the FSRC2 operation may include the single-precision sources ls0 and ls1, and a double-precision destination of ld0 (which includes ls0 and ls1). Execution of the FSRC2 operation causes the contents of ls0 and ls1 to be moved to a single, common physical register corresponding to ld0.

In some embodiments, usage of the FSRC2 micro-op may create false dependencies with prior floating-point operations. In other words, FSRC2 micro-ops may be inserted after potential evil twin producer that do not actually have an evil twin consumer. While these false dependencies can result in performance losses for single-precision floating-point code, the use of evil twin mitigation mode has been found to produce beneficial results for many relevant code sequences.

Figure 8:
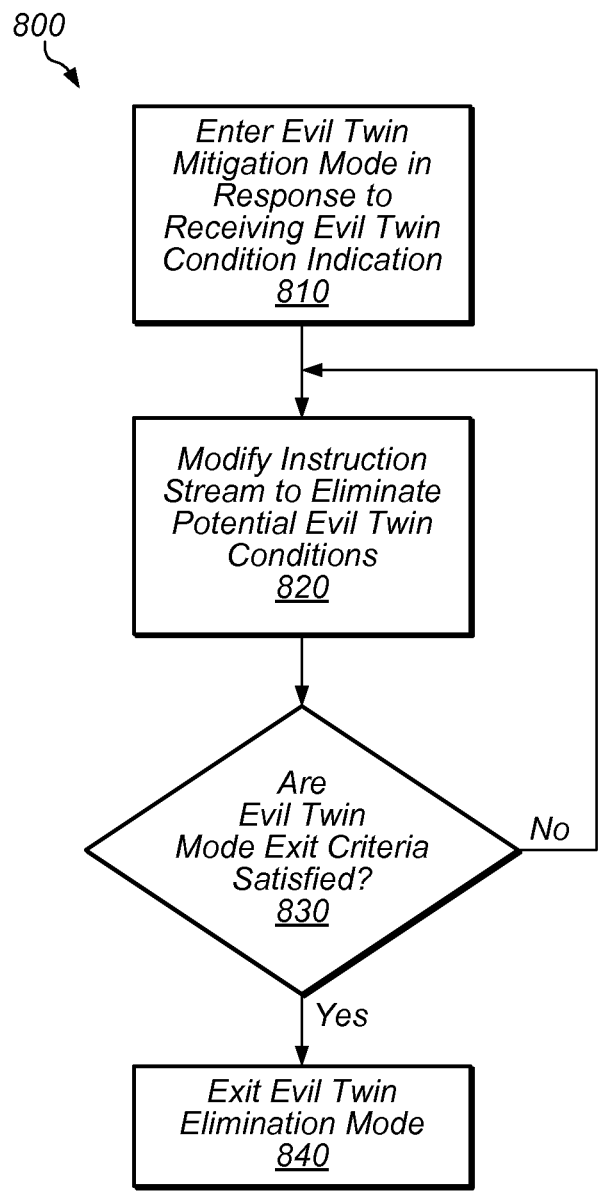
FIG. 8 is flowchart illustrating one embodiment of a method for mitigating evil twin conditions.
Figure 9:
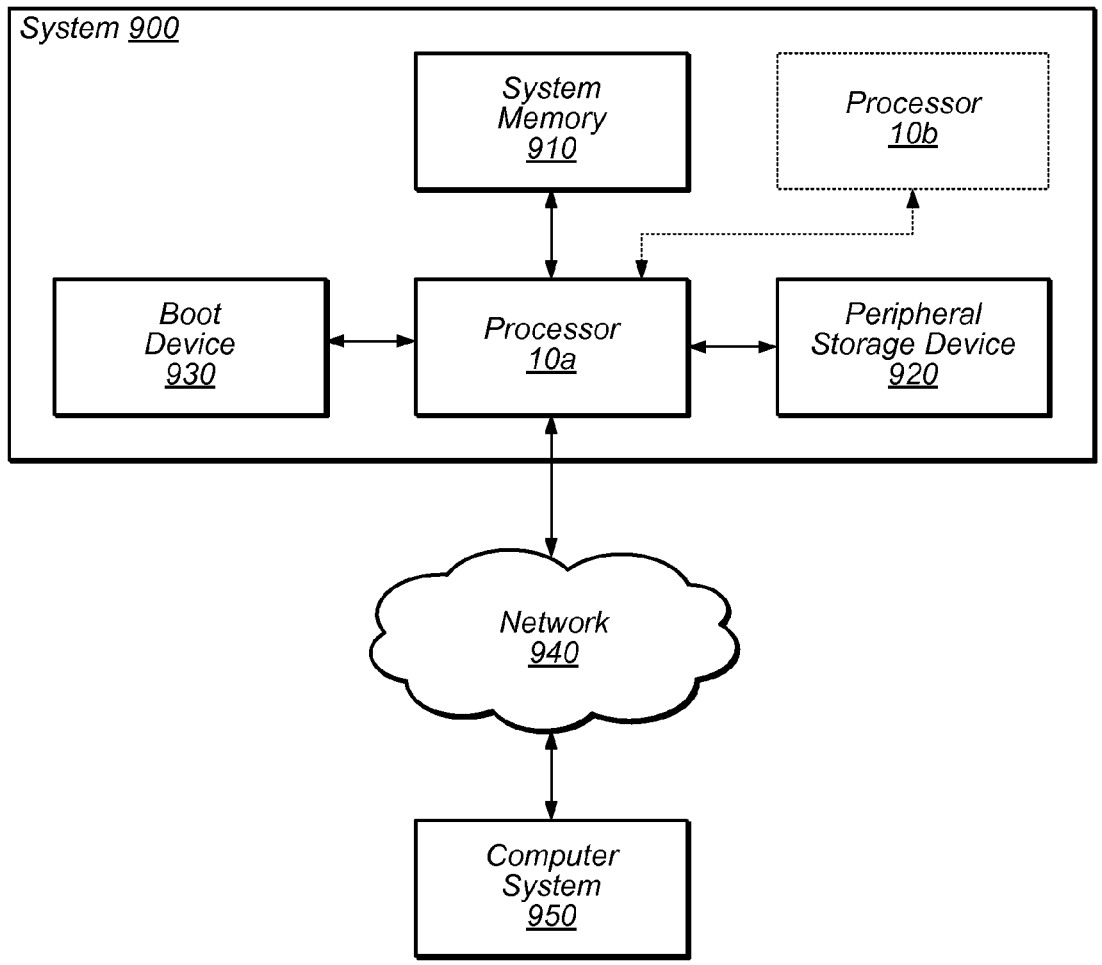
FIG. 9 is a block diagram illustrating one embodiment of a system including processor 10.

Turning now to FIG. 8, one embodiment of a method 800 for mitigating evil twin conditions is shown. In one embodiment, method 800 may be performed on a per-thread basis for a multithreaded processor.

In step 810, the processor enters evil twin mitigation mode (e.g, for the executing thread) in response to receiving an indication that an evil twin condition has been identified. As described above, in some embodiments, step 810 may include various operations such as trap logic unit 275 performing a trap flush upon entering evil twin mode. Step 810 may also include communicating an instruction, command, or other indication of the evil twin mitigation mode to decode unit 215 via interconnect 510. Such indication may include, in one embodiment, setting a register or other storage location in decode unit 215 or elsewhere.

In step 820, the processor (e.g., decode unit 215) modifies an instruction stream in order to eliminate evil twin conditions. Upon entering evil twin mitigation mode, decode unit 215, in one embodiment, identifies instructions that may create dependencies as described above (e.g., evil twin producers) and modifies the instruction stream to eliminate these potential dependencies. In certain embodiments, decode unit 215 is configured to insert a move instruction such as the "fmovstod" or "FSRC2" instructions described above as a second micro-op of a complex2 operation. As described above, such modification may be performed on a thread-by-thread basis.

In step 830, the processor determines whether the current state information (e.g., that stored by trap logic unit 275) satisfies one or more evil twin mode exit criteria. In various embodiments, this state information may include a number of committed instructions, a number of renamed instructions, or any other criteria such as those described above. For example, in one particular embodiment, trap logic unit 275 is configured to instruct the processor to exit evil twin mitigation mode (e.g., for a particular thread) once 256 single-precision floating-point writes are committed. (In various embodiments, this number could be approximately 256 such writes, meaning for the purposes of this disclosure, 225-275 writes.) Such a threshold may be dynamically configurable by the processor in some embodiments. If the exit criteria are satisfied, method 800 proceeds to step 840. Otherwise, method 800 returns to step 820 and continues to modify the instruction sequence for the executing thread.

In step 840, processor exits evil twin mitigation mode and returns to normal operating mode. The processor may repeat method 800 again once a subsequent evil twin condition is identified.

As noted above, the embodiments described herein are not applicable exclusively to architectures having single-precision and double-precision registers. Although the term "evil twin" is used to describe a dependency condition involving single-precision writes followed by double-precision reads, the techniques described herein may be applicable to any suitable combination of registers types and sizes involving a dependency based on a write to a portion of a logical storage location followed by a read from a larger portion or entirety of the same logical storage location.

Exemplary System Embodiment

As described above, in some embodiments, processor 10 of FIG. 1 may be configured to interface with a number of external devices. One embodiment of a system including processor 10 is illustrated in FIG. 9. In the illustrated embodiment, system 900 includes an instance of processor 10, shown as processor 10a, that is coupled to a system memory 910, a peripheral storage device 920 and a boot device 930. System 900 is coupled to a network 940, which is in turn coupled to another computer system 950. In some embodiments, system 900 may include more than one instance of the devices shown. In various embodiments, system 900 may be configured as a rack-mountable server system, a standalone system, or in any other suitable form factor. In some embodiments, system 900 may be configured as a client system rather than a server system.

In some embodiments, system 900 may be configured as a multiprocessor system, in which processor 10a may optionally be coupled to one or more other instances of processor 10, shown in FIG. 9 as processor 10b. For example, processors 10a-b may be coupled to communicate via their respective coherent processor interfaces 140.

In various embodiments, system memory 910 may comprise any suitable type of system memory as described above, such as FB-DIMM, DDR/DDR2/DDR3/DDR4 SDRAM, or RDRAM®, for example. System memory 910 may include multiple discrete banks of memory controlled by discrete memory interfaces in embodiments of processor 10 that provide multiple memory interfaces 130. Also, in some embodiments, system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 920 may be coupled to processor 10 via peripheral interface(s) 150 of FIG. 1.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc. In some embodiments, processor 10 may be configured to communicate with network 940 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processor configured to enter an operating mode in response to receiving an indication of a dependency between a) a first floating-point instruction in a sequence of instructions having as a destination a first portion of a first of a plurality of logical registers, and b) a second, subsequent floating-point instruction in the sequence of instructions having as a source the first portion and a second portion of the first logical register, wherein the processor is configured to enter the operating mode by taking a trap flush, wherein the processor is configured to maintain a counter indicative of a number of single-precision-destination floating-point instructions committed since the processor entered the operating mode, and wherein the processor is configured to exit the operating mode in response to the counter satisfying a threshold;
wherein the processor includes a first circuit configured to insert an instruction into the sequence of instructions when the processor is in the operating mode, wherein the first circuit is not configured to insert the instruction into the sequence of instructions when the processor is not in the operating mode, and wherein the inserted instruction is executable by the processor to move an aliased set of floating-point logical registers into a floating-point physical register, wherein the aliased set includes the destination of the first floating-point instruction, wherein the inserted instruction is inserted without modifying either the first floating-point instruction or the second floating-point instruction.

2. The apparatus of claim 1, wherein the first circuit is configured to receive entry and exit indications from a second circuit, wherein execution of the first floating-point instruction includes a single-precision write, and wherein execution of the second floating-point instruction includes a double-precision read.

3. The apparatus of claim 2, wherein the processor is a multithreaded processor, and wherein the second circuit includes a plurality of counters, each corresponding to a thread supported by the processor, wherein each of the plurality of counters is configured to store a respective value indicating a number of single-precision-destination floating-point instructions committed for a corresponding thread since the processor entered the operating mode.

4. The apparatus of claim 1, wherein the inserted instruction is defined within an instruction set architecture for the processor.

5. The apparatus of claim 1, wherein the processor is configured to determine that the first floating-point instruction has as a destination the first portion and that a third floating-point instruction has as a destination the second portion, and wherein the first circuit is configured to insert the instruction directly after the third float-point instruction and not directly after the first floating-point instruction.

6. The apparatus of claim 2, wherein the first circuit is a decode unit configured to perform decode operations on instructions in the sequence of instructions, and wherein the second circuit is a logic unit configured to manage handling of exceptions.

7. A method, comprising:
a circuit of a computer processor receiving a sequence of instructions to be executed;

the circuit receiving an indication that the computer processor has entered an evil twin mitigation mode, wherein, in response to detecting a pair of instructions having an evil twin condition, the computer processor is configured to take a trap flush and enter the evil twin mitigation mode, wherein the computer processor is configured to take the trap flush in response to one of the pair of instructions being an oldest instruction being executed by the computer processor, and wherein the trap flush includes flushing an execution pipeline of the computer processor;

the circuit modifying the sequence of instructions while the computer processor is in an evil twin mitigation mode, wherein the modifying includes inserting one or more instructions into the sequence of instructions to mitigate detected evil twin conditions, wherein the inserting does not modify either of the detected pair of instructions.

8. The method of claim 7, wherein the circuit inserts a single instruction for each detected evil twin condition.

9. The method of claim 7, wherein the inserted one or more instructions are defined within an instruction set architecture of the computer processor.

10. The method of claim 7, further comprising:
the computer processor exiting the evil twin mitigation mode in response to a predetermined number of floating-point instructions with single-precision destinations being committed during evil twin mitigation mode.

11. The method of claim 7, wherein the computer processor is multithreaded, and wherein the method is performed on a per-thread basis.

12. The method of claim 11, wherein said modifying includes decoding a first instruction that is a potential evil twin producer as two instructions, the first of which is the first instruction, the second of which is an instruction that is executable by the computer processor to move both halves of the aliased register pair that includes a destination of the evil twin producer to a common double-precision physical register.

13. The method of claim 7, further comprising:
the computer processor exiting the evil twin mitigation mode in response to committing a predetermined number of instructions.

14. The method of claim 7, further comprising:
the computer processor exiting the evil twin mitigation mode in response to a predetermined number of floating-point instructions with single-precision destinations being renamed during evil twin mitigation mode.

15. A processor, comprising:
a rename unit configured to rename logical registers to physical registers;
a detection circuit configured to determine whether to enter and exit an operating mode in which one or more instructions are inserted into an instruction sequence of the processor to mitigate potential dependencies between groups of instructions in which a first instruction has as a destination a first portion of a first logical register and a second instruction has as a source the first portion and a second portion of the first logical register, wherein the inserted one or more instructions are inserted without modifying either the first instruction or the second instruction, and wherein the detection circuit is configured to determine to enter the operating mode in response to identifying a dependency between a group of instructions; and
wherein the processor is configured to take a trap flush in response to determining to enter the operating mode.

16. The processor of claim 15, further comprising:
a decode unit configured to insert the one or more instructions, wherein the one or more instructions are executable by the processor to move an aliased set of logical registers into a physical register.

* * * * *